United States Patent [19]

Giuffra

[11] 4,180,746

[45] Dec. 25, 1979

[54] INTERLOCKED BATTERY JUMPER CABLE ASSEMBLY

[76] Inventor: William E. Giuffra, 1111 Buena Vista Dr., Jackson, Calif. 95642

[21] Appl. No.: 957,752

[22] Filed: Nov. 6, 1978

[51] Int. Cl.² .................... H02J 7/34; H01R 3/02; H02H 11/00

[52] U.S. Cl. .................... 307/127; 320/26; 307/130; 307/146

[58] Field of Search ............. 320/25, 16, 6, 26; 307/48, 49, 125, 127, 130, 146; 361/78

[56] References Cited

U.S. PATENT DOCUMENTS

| | | | |
|---|---|---|---|
| 3,051,887 | 8/1962 | Lind | 320/25 |
| 3,281,816 | 10/1966 | Raymond | 320/25 X |
| 3,308,365 | 3/1967 | St. John | 320/25 |
| 3,341,762 | 9/1967 | Rockoff | 320/25 X |
| 3,343,057 | 9/1967 | Smith | 320/25 X |
| 3,413,487 | 11/1968 | Gershen | 320/26 X |
| 3,590,357 | 6/1971 | Reid | 320/25 X |

*Primary Examiner*—L. T. Hix
*Assistant Examiner*—James L. Dwyer
*Attorney, Agent, or Firm*—Phillips, Moore, Weissenberger, Lempio & Majestic

[57] ABSTRACT

A battery jumper cable assembly (15) including a pair of solenoids (100,200) connected to provide an interlock preventing the direct connection of two batteries (10,20) in series with each other by means of such cable assembly is disclosed. The operation of the cable assembly under various operating conditions is described. The essential features of the solenoids and the interconnection of alternate types of switch elements in the cable assembly are disclosed.

10 Claims, 5 Drawing Figures

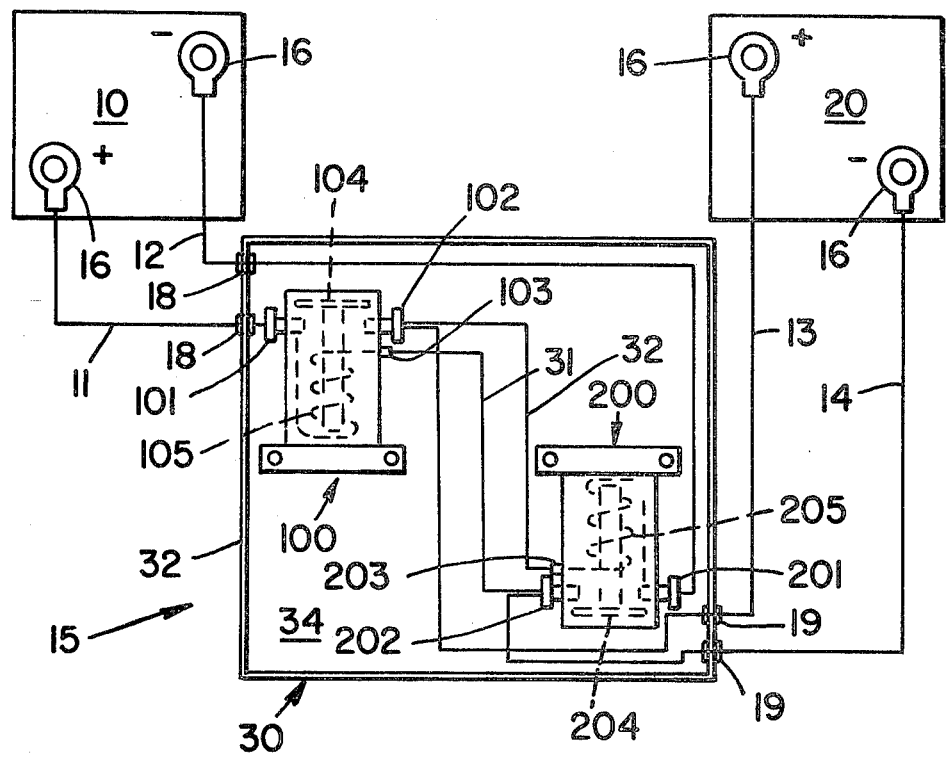
FIG_1
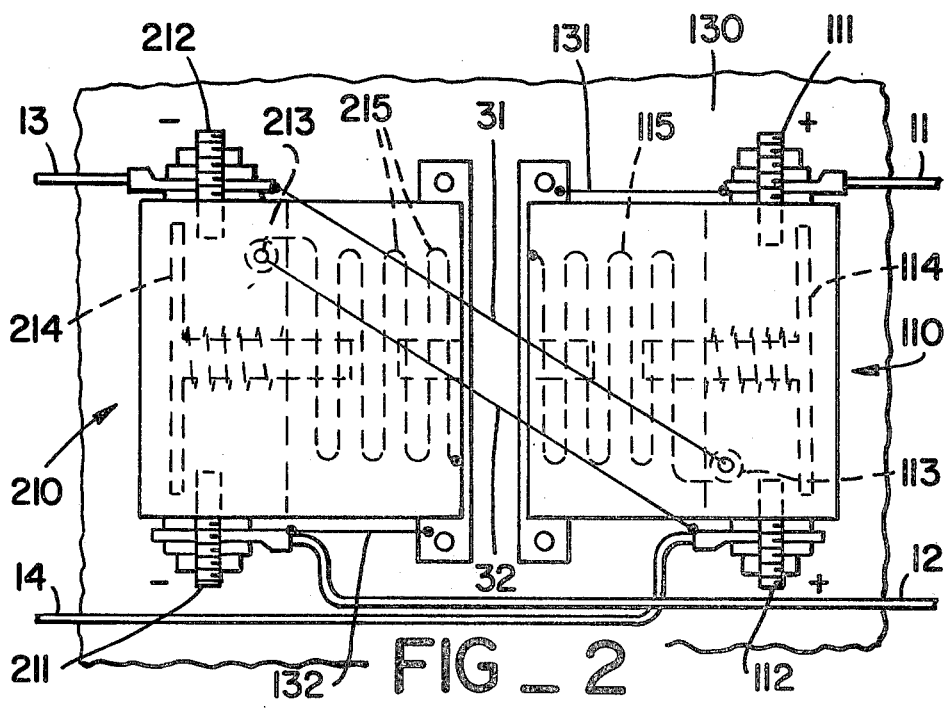
FIG_2

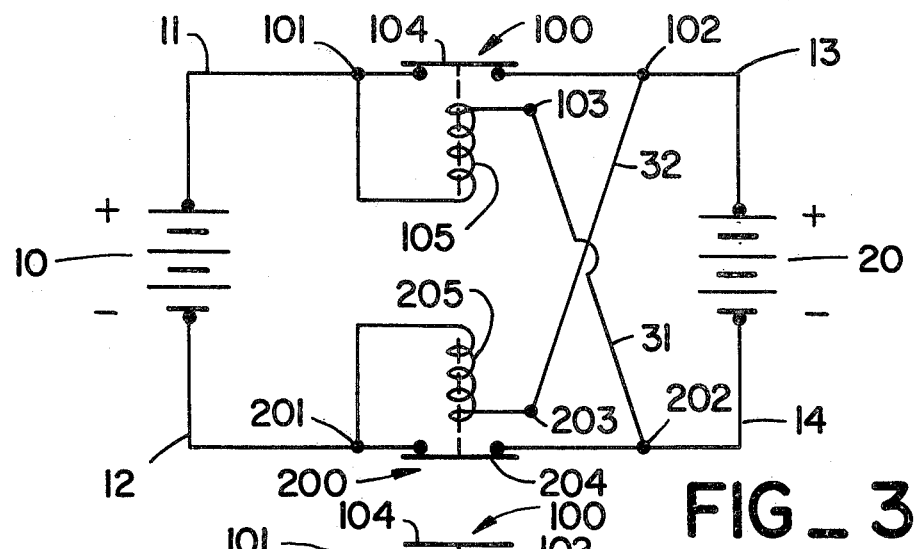
FIG_3
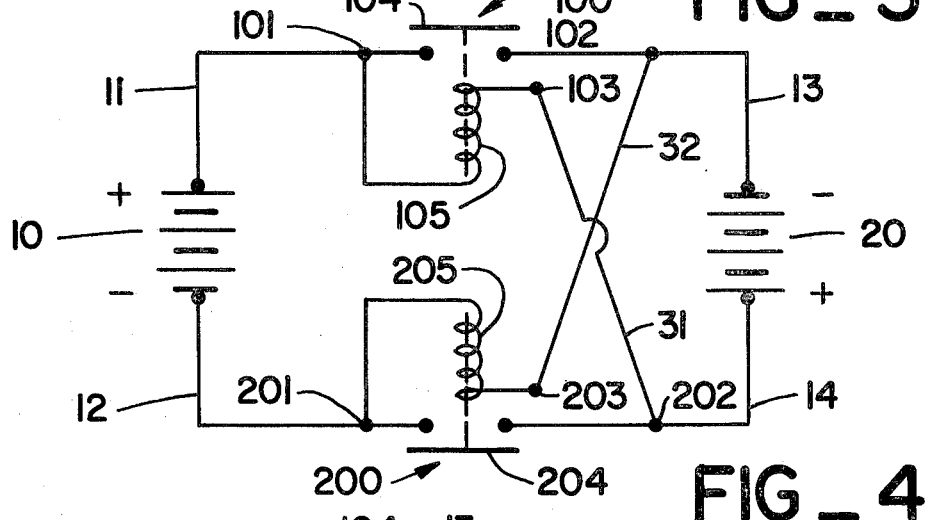
FIG_4
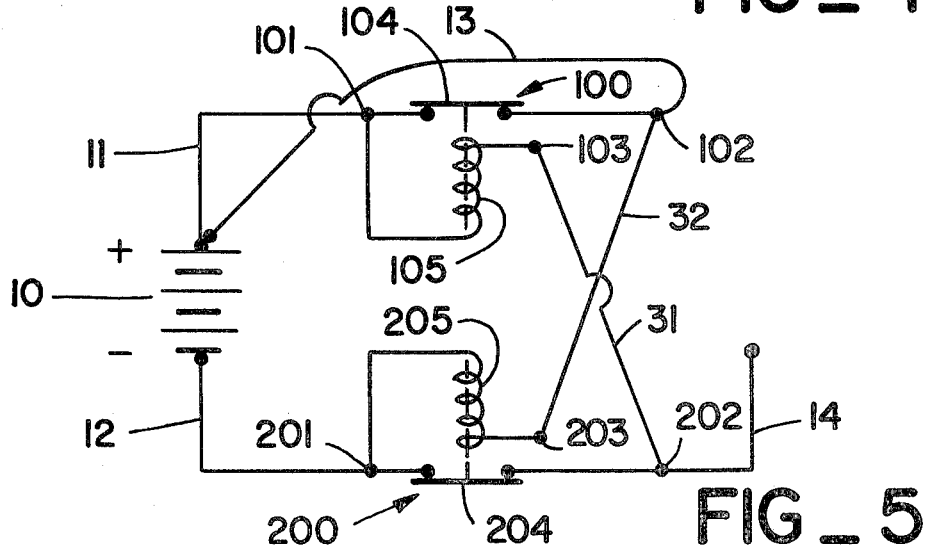
FIG_5

INTERLOCKED BATTERY JUMPER CABLE ASSEMBLY

DESCRIPTION

1. Technical Field

This invention relates to battery jumper cables and more particularly to a new and improved battery jumper cable assembly including interlocked circuitry to prevent the direct connection of two batteries in series with each other by means of such cable.

2. Background Art

The use of jumper cables to connect a fully charged storage battery of one automobile to the discharged storage battery of a second automobile in order to start the second automobile is well known in the art. It is of course essential that the storage batteries be connected in parallel. In other words, one jumper cable must interconnect the positive poles of the two batteries and the other jumper cable must interconnect the two negative poles of the storage batteries.

If the storage batteries are not connected in parallel but in series (i.e. with the positive pole of one battery connected to the negative pole of the other battery) then the charge of the fully charged battery will tend to be dumped into the discharged battery at very high current flow. The result will be excessive sparking at the last pole of the batteries to which connection is made, overheating of the jumper cables, and overheating of the batteries themselves due to the excessive current flow. It is not uncommon for an explosion or fire to occur under such circumstances, to say nothing of the possibility that the person applying or removing the jumper cables will be burned.

In the prior art it has been customary to make a pair of jumper cables of different colors or to otherwise attempt to mark the ends of the jumper cables so that they will not be improperly connected. However, persons using the jumper cables are often inexperienced and become confused as to their proper use. Such confusion, complicated by a feeling of apprehension, often results in the improper use of jumper cables with highly undesirable, dangerous or injurious results.

DISCLOSURE OF THE INVENTION

The present invention is directed to overcoming one or more of the problems as set forth above.

According to the present invention, a jumper cable which can only interconnect a pair of storage batteries in parallel with each other includes a support member with first and second normally opened switch elements mounted on the support member. First and second lengths of jumper cable are mounted with respect to the support member to define a pair and second and third lengths of jumper cable are also mounted with respect to the support member to define a pair. The first and second normally open switch elements each have first, second and third electrical connections thereto and each is responsive to the normal voltage of the storage batteries when applied between the first and third electrical connections thereof to automatically interconnect the first and second electrical connections thereof. The jumper cable assembly includes electrically conductive means interconnecting the second electrical connection of the first switch element and the third electrical connection of the second switch element as well as electrically conductive means interconnecting the second electrical connection of the second switch element and the third electrical connection of the first switch element. One end of the first length of jumper cable is electrically connected to the first electrical connection of the first switch element, one end of the second length of jumper cable is electrically connected to the first electrical connection of the second switch element, one end of the third length of jumper cable is electrically connected to the second electrical connection of the first switch element and one end of the fourth length of jumper cable is electrically connected to the second electrical connection of the second switch element. The other ends of each of the lengths of jumper cable are provided with means for making removable electrical connection to a pole of the storage batteries.

BRIEF DESCRIPTION OF THE DRAWINGS

FIG. 1 is a plan view of the interlocked portion of a jumper cable assembly according to a preferred embodiment of this invention, together with a pair of storage batteries and shows the electrical interconnections therebetween in wiring diagram form.

FIG. 2 is a fragmentary plan view of the interlocked portion of another embodiment of this invention with internal elements indicated in phantom.

FIG. 3 is a schematic diagram of a preferred embodiment of the jumper cable assembly according to this invention properly interconnecting a pair of storage batteries.

FIG. 4 is a schematic diagram identical to FIG. 3, but showing a pair of storage batteries improperly connected.

FIG. 5 is a schematic diagram identical to FIGS. 3 and 4 but illustrating the actuation of the interlock device by means of one fully charged battery.

BEST MODE FOR CARRYING OUT THE INVENTION

Referring to FIG. 1, a pair of storage batteries 10 and 20 are shown interconnected to each other in parallel by a jumper cable assembly 15 according to the teaching of this invention. As shown in FIG. 1, a first length of jumper cable 11 is connected to the positive pole of battery 10 and a second length of jumper cable 12 is connected to the negative pole of battery 10. A third length of jumper cable 13 is attached to the positive pole of battery 20 and a fourth length of jumper cable 14 is attached to the negative pole of battery 20. According to this invention each of the lengths of jumper cable 11, 12 13 and 14, are provided with means 16 for making removable electrical connection to a pole of storage batteries 10 and 20.

According to the embodiment of this invention to be described in connection with FIG. 1, the storage batteries 10 and 20 are automotive batteries of the 12 volt type currently used in electrical systems of automobiles. The jumper cable assembly 15 according to this invention may be easily adapted for use in interconnecting a pair of any type of storage batteries including automotive batteries of the 6 volt type which are also used in the electrical systems of automobiles.

According to the embodiment of this invention shown in FIG. 1, the jumper cable assembly 15 includes a support member 30 which may be in the form of an open top metallic box having sides 33 and a bottom 34, for example. A first electromagnetic solenoid 100 and a second electromagnetic solenoid 200 are mounted on the supporting member 30, for example by being fastened to the bottom 34 in spaced relation to each other. The solenoids 100 and 200 may be starter switches of the type sold by Bendix Corporation under Type No. SW89 for example. Such starter switches comprise a housing containing a normally open switch element adapted to be actuated to its closed position by means of an electromagnetic coil. Thus the first solenoid 100 is provided with a first electrical terminal 101, a second electrical terminal 102, and a third electrical terminal 103. The solenoid plunger or contact element 104 is adapted to interconnect the first 101 and second 102 electrical terminals when actuated by means of electrical current passing through the coil 105 of the solenoid 100. One end of the coil 105 is connected to the first electrical terminal 101 and the other end of the coil 105 is connected to the third electrical terminal 103.

A second solenoid 200 is identical to the first solenoid 100 and comprises the first 201 and second 202 electrical terminals adapted to be interconnected by the plunger or contact element 204 of the solenoid when actuated by the coil 205 connected between the first terminal 201 and the third terminal 203 of the solenoid 200. A first electrically conductive means 31 which may be an insulated wire for example, interconnects the third terminal 103 of the first solenoid 100 and the second terminal 202 of the second solenoid 200. Similarly, a second electrically conductive means 32 electrically interconnects the third terminal 203 of the second solenoid 200 and the second electrical terminal 102 of the first solenoid 100.

As shown in FIG. 1, the first length of jumper cable 12 passes through an insulator 18 in the side 33 of the support member 30 and is electrically connected to the first terminal 101 of the first solenoid 100. The second length of jumper cable passes through an insulator 18 in the side 33 of the support member 30 and is electrically connected to the first terminal 201 of the second solenoid 200. The insulators 18 are located with respect to each other in the side 32 of the support member 30 such that the first 11 and the second 12 lengths of jumper cable define a definite pair. Similarly, the third length of jumper cable 13 passes through an insulator 19 in the wall 33 of the support member 30 and is connected to the second terminal 102 of the first solenoid 100 and the fourth length of jumper cable 14 passes through an insulator 19 in the wall 33 of the support member 30 and is connected to the second terminal 202 of the second solenoid 200. Again, the insulators 19 are located in the wall 33 of the support member 30 with respect to each other so that the third 13 and fourth 14 lengths of jumper cable define a definite pair.

The operation of this embodiment of the invention will now be explained with reference to FIGS. 3 and 4, in addition to FIG. 1. As as can be seen from FIG. 3, when properly connected, the batteries 10 and 20 form a series circuit with coils 105 and 205, thus beginning at the negative terminal of battery 10, it will be seen that electrical current flows through the second length of jumper cable 12 to the first electrical terminal 201 of the second solenoid 200 and from thence through the coil 205 to the third electrical terminal of solenoid 200. From there, the electrical current flows through the electrically conductive means 32 to the third length of battery jumper cable 13 and the positive terminal of battery 20. From the negative terminal of battery 20 the current flows through the fourth length of battery jumper cable 14 to the second terminal 202 of the second solenoid 200 and from thence through the first electrically conductive means 31 to the third terminal 103 of the first solenoid 100. From there, the electrical current flows through the coil 105 of the first solenoid 100 to the first terminal 101 thereof and the first length of battery jumper cable 11 which returns the current flow to the positive terminal of the battery 10. Thus each of the coils 105 and 205 will have 12 volts imposed thereacross which will actuate their associated plungers or contact elements 104 and 204, respectively, interconnecting the batteries 10 and 20 in parallel with each other. It should be emphasized that the solenoids 100 and 200 are essentially voltage responsive since a very small current is required through the coils 105 and 205 thereof. Thus, even though the battery 20, for example, may be essentially fully discharged, it will still produce the full 12 volt rating thereof, although it is only capable of supplying a very small current at such voltage. As soon as the contact elements 104 and 204 close, the coils 105 and 205 will be connected in parallel across the battery 10 and will remain energized.

FIG. 4 is a schematic diagram identical to FIG. 3 except that the polarity of battery 20 has been reversed to illustrate the operation of the jumper cable of this invention when improperly connected. Even if the battery 20 is essentially fully discharged, it will nevertheless produce a substantial proportion of its full voltage and the coils 105 and 205 of the solenoids 100 and 200 will tend to have substantially 0 volts imposed thereacross. Thus neither of the solenoids will be actuated and the only electrical connection between the batteries 10 and 20 will be through the relatively high resistance of the coils 105 and 205.

Similarly, the solenoids 100 and 200 will not be actuated if the battery 20 is either completely dead or shorted out even if the jumper cable assembly is properly connected. If battery 20 is shorted, whether properly connected or not, the coils 105 and 205 of the solenoids will be connected in series across battery 10 reducing the voltage thereacross to 6 volts which is insufficient to actuate the solenoids. If the battery 20 is dead it will act as an open circuit element and no complete electrical circuit will result from connections made to it. Thus if the jumper cable assembly cannot be actuated by reversing the connection to the battery 20, it would indicate that the battery 20 is either dead or shorted. In such a situation, battery 20 should be disconnected from the electrical system of the automobile in which it is installed.

Referring to FIG. 5, it is possible to actuate the jumper cable assembly according to its invention from a single fully charged battery. This is accomplished by connecting the first 11 and second 12 lengths of jumper cable to the battery 10 and then touching the third length of battery cable 13 to the pole of the battery 10 to which the first length of jumper cable is connected. Alternatively, the electrical connection at the end of the fourth length of jumper cable 14 could be touched to the pole of the battery 10 to which the second length of jumper cable 12 is connected. In either case, the full voltage of the battery 10 will be placed across the coil of one of the solenoids. Thus, as shown in FIG. 5, the full voltage of battery 10 will be placed across the coil 205 of the second solenoid 200 actuating the plunger 204 thereof. When the plunger 204 closes, the coil 105 of the first solenoid 100 will be connected in parallel with the coil 205 of the second solenoid across the battery 10 and will also be actuated. The solenoids 100 and 200 will remain in their closed position whether the third length of jumper cable 13 remains in electrical contact with the battery 10 or not. It is a characteristic of the jumper cable assembly of this invention that, once actuated, it will remain actuated until it is fully disconnected from at least one pole of each battery to which it was connected. Thus the interlock feature of the jumper cable assembly of this invention will be bypassed allowing it to be used in the same manner as jumper cables of the prior art where necessary or desirable.

Referring to FIG. 2, an embodiment of this invention is shown which utilizes the type of starter solenoid having a metallic housing or case with one end of the coil thereof electrically connected to the housing or case which is grounded to the block upon installation of the solenoid. Such solenoids may be of the type manufactured by Echlin Corporation under the type no. ST81 which is used by Ford Motor Company, whereas the Bendix solenoid mentioned with reference to FIG. 1 is used by General Motors.

In the embodiment shown in FIG. 2, the support member 130 is made of insulating materials such as an impact-resistant plastic, for example. The solenoids 110 and 210 are mounted on the insullating support member 130 in spaced insulating relationship to each other and preferably in coaxial alignment. The solenoids of this type are provided with a fourth electrical terminal for use in starter applications to provide for ignition assist starting which fourth electrical terminal is not used in making the embodiment of this invention shown in FIG. 2. As shown in FIG. 2, the solenoids 110 and 210 include first (111, 211) electrical terminals, and second (112, 212) electrical terminals adapted to be interconnected by the normally open solenoid plunger or contact (114, 214) thereof. These solenoids also include a third electrical terminal (113, 213) connected to one end of the coil (115, 215) thereof. According to this embodiment of the invention, electrically conductive means (131, 132) is provided between the first electrical terminal (111, 211) and the case or housing of the solenoid (110, 210) thus making electrical connection to the other end of the coil (115, 215) thereof. The lengths of jumper cable are connected to the solenoids (110, 210) and the solenoids (110, 210) are interconnected with each other in the same way as in the embodiment of FIG. 1. Thus, the same reference numerals have been used in FIG. 2 to identify common elements for ease of comparison. Thus the first length of jumper cable 11 is connected to the first electrical terminal 111 of solenoid 110, the second length of jumper cable 12 is connected to the first electrical terminal 211 of the second solenoid 210, the third length of jumper cable 13 is connected to the second electrical terminal 212 of the second solenoid 210, and the fourth length of jumper cable 14 is connected to the second electrical terminal 112 of the first solenoid 110. Similarly, electrically conductive means 31 connects the third electrical terminal 113 of the first solenoid 110 to the second electrical terminal 212 of the second solenoid 210 and second electrically conductive means 32 connects the third electrical terminal 210 of the second solenoid 210 to the second electrical terminal 112 of the first solenoid 110.

As shown in FIG. 2, the first and second lengths of jumper cable 11 and 12 are mounted with respect to the support member 130 to define a first pair, and the third and fourth lengths of jumper cable 13 and 14 are mounted with respect to the support member 130 to define a second pair. It should be understood that the support member 130 of FIG. 2 may take any convenient form suitable for mounting the solenoids 110 and 210 to each other in spaced insulating relationship. Similarly, the support member 30 of FIG. 1 may take any convenient form suitable for rigidly mounting the solenoids 100 and 200 with respect to each other but may be made of either insulating or conductive material. Preferably, the supporting members 30 and 130 are made of an impact-resistant plastic providing the insulating characteristics necessary for the embodiment of FIG. 2. The supporting member 130 together with the solenoids (100, 200) or (110, 210) must enable the lengths of jumper cable 11, 12, 13 and 14 to be mounted in such a way as to define first and second pairs as described above, but may otherwise take any convenient form although the box like structure of FIG. 1 is preferred.

The embodiment of FIG. 2 operates in exactly the same manner as described in connection with the embodiment of FIG. 1. Thus, the only differences between the embodiments of FIGS. 1 and 2 is the type of solenoid used. Solenoids of either type are believed to be available for six volt systems as well as for twelve volt systems, and such solenoids could be readily designed for use with batteries of any voltage rating.

It is believed that those skilled in the art will make obvious modifications in the jumper cable assembly as disclosed herein and specifically described in connection with the drawing. For example, normally open solenoids differing from those specifically mentioned herein above, could be used provided they are essentially voltage responsive and capable of operating properly at the currents and voltages involved. Similarly, voltage responsive normally open switch devices other than solenoids could be used if properly designed for the currents and voltages involved. Other aspects, objects, and advantages of this invention may be discerned from a study of the drawing, the disclosure, and the appended claims.

I claim:
1. A jumper cable assembly for directly interconnecting a pair of a given type storage battery only in parallel with each other comprising:
   (a) a support member;
   (b) a first normally open switch element mounted on said support member having first, second and third electrical terminals and responsive to the normal voltage of said given type of storage battery when applied between said first and third electrical terminals to interconnect said first and second electrical terminals;
   (c) a second normally open switch element mounted on said support member having first, second and third electrical terminals and responsive to the normal voltage of said given type of storage battery when applied between said first and third electrical terminals to interconnect said first and second electrical terminals;
   (d) electrically conductive means electrically interconnecting said second electrical terminal of said first switch element and said third electrical terminal of said second switch element;
   (e) electrically conductive means electrically interconnecting said second electrical terminal of said second switch element and said third electrical terminal of said first switch element;
   (f) first and second lengths of jumper cable mounted with respect to said support member to define a pair with one end of each of said first and second lengths of jumper cable having means thereon for making removable electrical connection to a pole of a battery of said given type, the other end of said first length of jumper cable being electrically connected to said first electrical terminal of said first switch element and the other end of said second length of jumper cable being electrically connected to said first electrical terminal of said second switch element; and (g) third and fourth lengths of jumper cable mounted with respect to said support member to define a pair with one end of each of said third and fourth lengths of jumper cable having means thereon for making removable electrical connection to a pole of a battery of said given type, the other end of said third length of jumper cable being electrically connected to said second electrical terminal of said first switch element and the other end of said fourth length of jumper cable being electrically connected to said second electrical terminal of said second switch element.

2. A jumper cable assembly as claimed in claim 1 wherein said first and second normally open switch element each comprises a solenoid having an actuating coil with one end connected to the third electrical terminal thereof and the other end electrically connected to the first electrical terminal thereof.

3. A jumper cable assembly as claimed in claim 2 wherein said pair of storage batteries are of the type used in the electrical system of automobiles and said first and second switch elements each comprise a starter solenoid of the type used with said type of storage battery in the electrical system of an automobile.

4. The jumper cable assembly as claimed in claim 3 wherein said electrical system of said automobile is of the 12 volt type utilizing a 12 volt battery and 12 volt starter solenoid.

5. The jumper cable assembly as claimed in claim 3 wherein said electrical system of said automobile is of the 6 volt type utilizing a 6 volt storage battery and a 6 volt starter solenoid.

6. The jumper cable assembly as claimed in claim 2 wherein said support member is made of electrically insulating material.

7. The jumper cable assembly as claimed in claim 6 wherein each said solenoid has a metallic case with one end of said coil electrically connected to said case and wherein conductive means electrically connects said case to said first electrical terminal thereof.

8. The jumper cable assembly as claimed in claim 2 wherein said support member is metallic and said actuating coil of each said solenoid is electrically insulated from said support member.

9. The jumper cable assembly as claimed in claim 1 wherein said first and second switch elements are mounted on said support member in mirror image alignment with each other.

10. The jumper cable assembly as claimed in claim 1 wherein said support member defines a box having four sides and a bottom with said first and second switch elements mounted therein, said first and second lengths of jumper cable extending through a first side of said box and said third and fourth lengths of jumper cable extending through a second side of said box.

* * * * *